Dec. 20, 1949     C. D. OLINGER     2,491,577
STOCK FEEDER
Filed May 4, 1945                 2 Sheets-Sheet 1
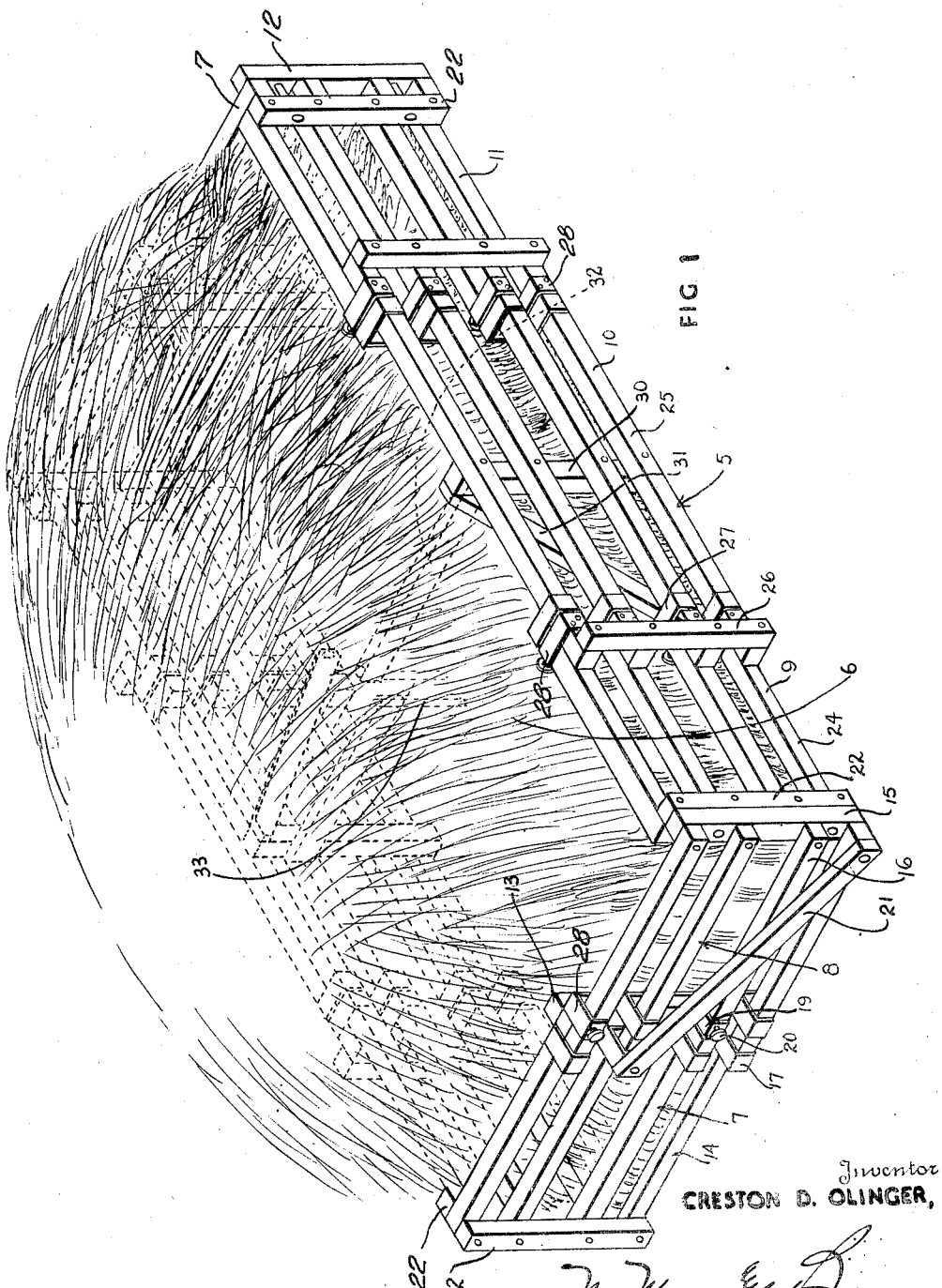
Inventor
CRESTON D. OLINGER, Dec. 20, 1949  C. D. OLINGER  2,491,577
STOCK FEEDER
Filed May 4, 1945  2 Sheets-Sheet 2
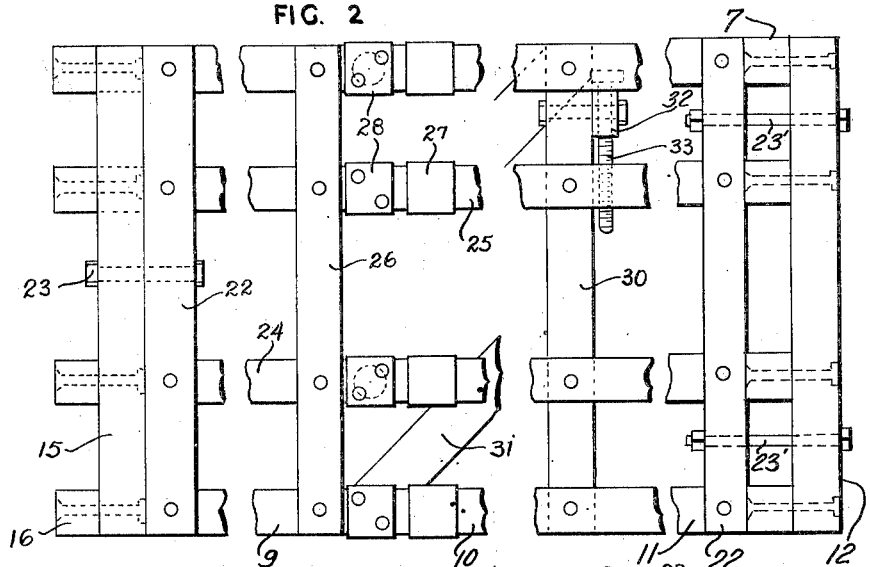
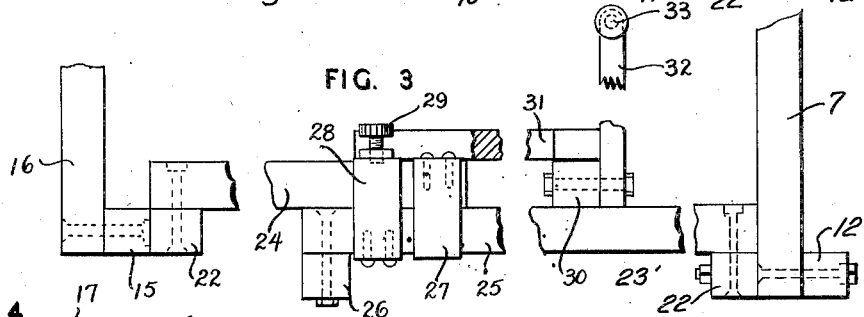
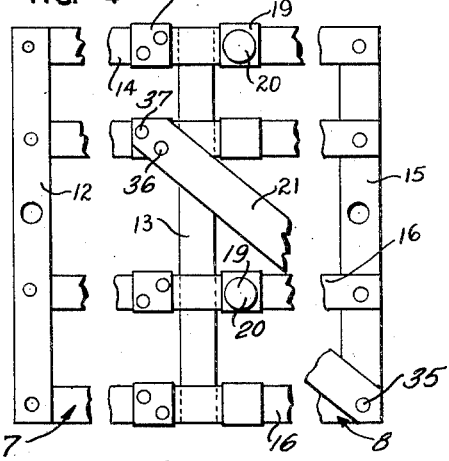
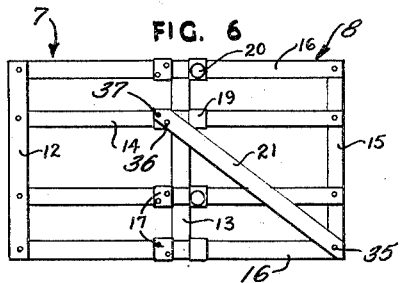
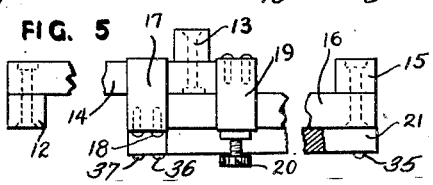
INVENTOR.
CRESTON D. OLINGER,
BY
ATTORNEYS Patented Dec. 20, 1949

2,491,577

UNITED STATES PATENT OFFICE 2,491,577

STOCK FEEDER

Creston D. Olinger, Pollock, Mo.

Application May 4, 1945, Serial No. 591,859

2 Claims. (Cl. 119—60)

The present invention relates to new and useful improvements in stock or cattle feeders for use by stock or cattle in the field while feeding from a hay rick or stack, and embodies the provision of an expansible and contractible fence adapted for mounting in position to surround a hay rick and including rails through which the cattle may feed, the fence protecting the rick from the cattle to prevent the cattle from pulling the hay therefrom and scattering the hay over the ground, and also embodying means for contracting the fence to maintain the same closely against the sides of the rick while the latter is being consumed by the cattle.

More specifically, the invention embodies the provision of a continuous sectional fence adapted to surround a hay rick or other feed for the cattle, and in which the sections of the fence are connected to each other in overlapping slidable relation at both the sides and at the ends of the fence so that the sections of the sides as well as the sections of the ends of the fence may be moved toward each other in a direction inwardly against the sides of the hay rick so that the cattle may have access thereto as the hay is consumed.

A further object of the invention is to provide a cattle feeder of this character of simple and practical construction, which is strong and durable, relatively inexpensive to manufacture, easy to erect in position for feeding purposes, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is an enlarged fragmentary elevational view of one side of the fence.

Figure 3 is a top plan view thereof.

Figure 4 is a view in elevation of one end of the fence.

Figure 5 is a top plan view thereof.

Figure 6 is an end elevational view showing the fence in its fully expanded position.

Referring now to the drawings in detail, wherein for the purpose of illustration I have disclosed a preferred embodiment of the invention, the numeral 5 designates the fence generally, which may be constructed of any suitable inexpensive material and of any desired size to surround a hay rick or haystack 6, the present embodiment of the invention embodying end sections 7 and 8 at each end of the fence and side sections 9, 10 and 11 for each side of the fence.

The end section 7 includes a corner post 12 and an inner end post 13 to which vertically spaced horizontal rails 14 are attached with the posts on opposite sides of the rails.

The end section 8 includes a corner post 15 to which vertically spaced rails 16 are attached at one end, the other ends of the rails 16 being provided with collars 17 secured at one side of the collars to the rails 16 by bolts or the like 18, the collars also slidably receiving the rails 14 between the posts 12 and 13, as shown to advantage in Figure 5 of the drawings.

Accordingly, the sections 7 and 8 at the ends of the fence are mounted for horizontal sliding movement relative to each other to increase or decrease the width of the fence.

The sections 7 and 8 are secured in slidably adjusted position relative to each other by means of collars 19 secured to the ends of the rails 14 beyond the post 13, the collars also slidably receiving the rails 16 of the section 8, the rails 16 being slidably secured in the collars 19 by means of set screws or clamping screws 20 threaded in said last-named collars.

The end section 8 of the fence is also provided with an inclined brace 21 which extends from the outer end of the lowermost rail 16 to the collar 17 at the inner end of an upper rail 16. One end of the brace 21 is secured to the outer end of the lowermost rail 16, Figure 6, by means of a bolt 35, while the other end of the brace is secured to the collar 17 at the inner end of an upper rail 16 by means of bolts 36 and 37. It is to be noted that this brace is only employed when the sections 7 and 8 are in their fully expanded position, as shown in Figures 1 and 6, and is placed in position after the sections 7 and 8 have been assembled in their fully expanded position. When the sections 7 and 8 are desired to be shifted to a retracted position, the brace 21 is detached by removing the bolts 35, 36 and 37, whereupon the sections 7 and 8, after loosening of the clamping screws 20, are shifted to the desired retracted position.

Each of the side sections 9 and 11 at the sides of the rick includes a corner post 22 which is secured to the adjacent corner posts 12 or 15 of one of the end sections 7 or 8 by means of bolts 23. At the near and far corners of the rick shown in Figure 1, the posts 15 and 22 are in abutting relation, whereas, at the right and left-hand corners of the enclosure, the posts 12 are positioned on the outside of the horizontal rail with the rails inbetween the posts 12 and 22, the latter-named posts being secured together by means of bolts 23'. To the post 22 are attached vertically spaced horizontal rails 24 extending inwardly toward the intermediate section 10 of the side of the fence and in overlapping relation with the vertically spaced rails 25 of said intermediate section. The ends of the rails 25 are connected to vertical posts 26.

To the inwardly projecting ends of the rails 24 of the side sections 9 and 11 are attached collars 27 slidably receiving the rails 25 while similar collars 28 are also attached to the rails 25 adjacent the posts 26 and slidably receive the rails 24, as shown to advantage in Figure 3 of the drawings. The collars 28 on the top rail and also on the lower intermediate rail are also provided with set screws or clamping screws 29 threaded therein for securing the rails 24 in slidably adjusted position in the collars 28.

The rails 25 of the intermediate section 10 at the sides of the fence are also provided with an intermediate post 30 from which a brace 31 extends from the upper portion of the post 30 to one of the collars 28 carried by one of the lower rails 25. The collars 28 of the lower rails are not provided with the clamping set-screws 29.

By releasing the set screws or clamping screws 29 at the ends of the intermediate section 10 at the sides of the fence, the sections 9 and 11 may be slidably adjusted along the intermediate section 10 whereby to increase or decrease the length of the fence and thus enable the several sections of the fence to be moved inwardly against the sides of the hay rick as the latter is consumed by cattle feeding through the rails of the fence.

The center posts 30 of the intermediate side sections 10 have transversely extending arms 32 attached thereto which extend midway across the rick with the rick in the full open position. The arms 32 are provided with vertical anchoring pins 33 at their inner ends adapted for anchoring in the rick 6 for securing the fence thereto, the arms 32 and pins 33 being movable inwardly of the rick as the ends of the fence are compressed or contracted. The arms 32 are positioned on opposite sides of the posts 30, thereby being offset in relation to each other.

In assembling the fence sections to form a rick, the side sections 9, 10 and 11 are placed back to back with the intermediate sections 10 on the outside of the fence at each side, and it is preferred to reverse the positions of the end sections 7 and 8 wherein these sections may be assembled in the shop with the parts in the same positions and the complete sections are turned around or placed back to back in assembling the rick.

It is believed that the details of construction, manner of use and advantages of the device will be readily understood from the foregoing without further detailed explanation.

It is to be understood, however, that even though I have herein shown and described a preferred embodiment of my invention that the same is susceptible of certain changes fully comprehended by the spirit of the invention as herein described, and the scope of the appended claims.

Having thus described the invention, what I claim is:

1. In a collapsible rick for feeding hay, straw, and the like, a continuous fence forming a rectangular shaped rick having telescoping side and end sections, said side and end sections comprising rigid sections with vertically spaced horizontal rails and fixed posts adjacent the ends thereof, and sliding sections with vertically spaced horizontal rails and fixed posts at one of the ends thereof, collars fixedly attached to the free ends of the rails of the sliding sections encircling corresponding rails of the rigid sections, collars fixedly mounted adjacent the ends of the rails of the rigid sections encircling corresponding rails of the sliding sections, said collars providing two supporting points for each sliding rail maintaining alignment of the telescoping fence sections of the rick, means attaching the side and end sections at the corners of the rick, center posts on the rigid sections of the sides of the rick, rails extending horizontally from said center posts inward substantially to the center of the rick, anchoring pins on the ends of the lower rails extending inward from said center posts, and diagonal braces on the rigid sections of the sides and sliding sections of the ends of the rick.

2. In a collapsible rick for feeding hay, straw, and the like, a continuous fence forming a rectangular shaped rick having vertically spaced horizontal rails and horizontally spaced vertical posts, each end of said ricks comprising a rigid fence section with posts fixedly mounted at the ends of the rails and with the ends of the rails extending beyond the posts at one end of the sections, and a sliding section with a post fixedly mounted at one end of the rails and in which the rails thereof are in registering position with the rails of the rigid section, collars fixedly mounted on the free ends of the rails of the sliding sections encircling the corresponding rails of the rigid sections and disposed for sliding action thereon, collars fixedly mounted on said extending ends of the rails of the rigid sections encircling the corresponding rails of the sliding sections and disposed for sliding action on said rails, and set-screws in the collars of the said extending ends of the rigid sections, and a diagonal brace on said sliding fence sections, and the sides of said rick comprising a rigid fence section with posts fixedly mounted at the ends of rails, and end sections with posts fixedly mounted at the ends of the rails at one end of the sections and in which the rails are in registering position with the rails of the rigid section, collars fixedly mounted on the free ends of the rails of the sliding sections encircling corresponding rails of the rigid sections and disposed for sliding action thereon, collars fixedly mounted on the rails of the rigid sections adjacent the posts thereof and encircling the corresponding rails of the sliding sections and disposed for sliding action thereon, set-screws in the collars of the rigid sections, diagonal braces on said rigid sections, center posts on the rigid sections of the side, rails extending horizontally from said center posts inward substantially to the center of the rick, and means attaching the side and end sections at the corners of the rick.

CRESTON D. OLINGER.

REFERENCES CITED

The following references are of record in the file of this patent:

UNITED STATES PATENTS

| Number | Name | Date |
|---|---|---|
| 113,753 | Drummond | Apr. 18, 1871 |
| 162,850 | Ostrander | May 4, 1875 |
| 479,680 | Thompson | July 26, 1892 |
| 1,280,614 | Budin | Oct. 1, 1918 |
| 1,505,137 | Gee | Aug. 19, 1924 |
| 2,405,535 | Weiss | Aug. 6, 1946 |